UNITED STATES PATENT OFFICE.

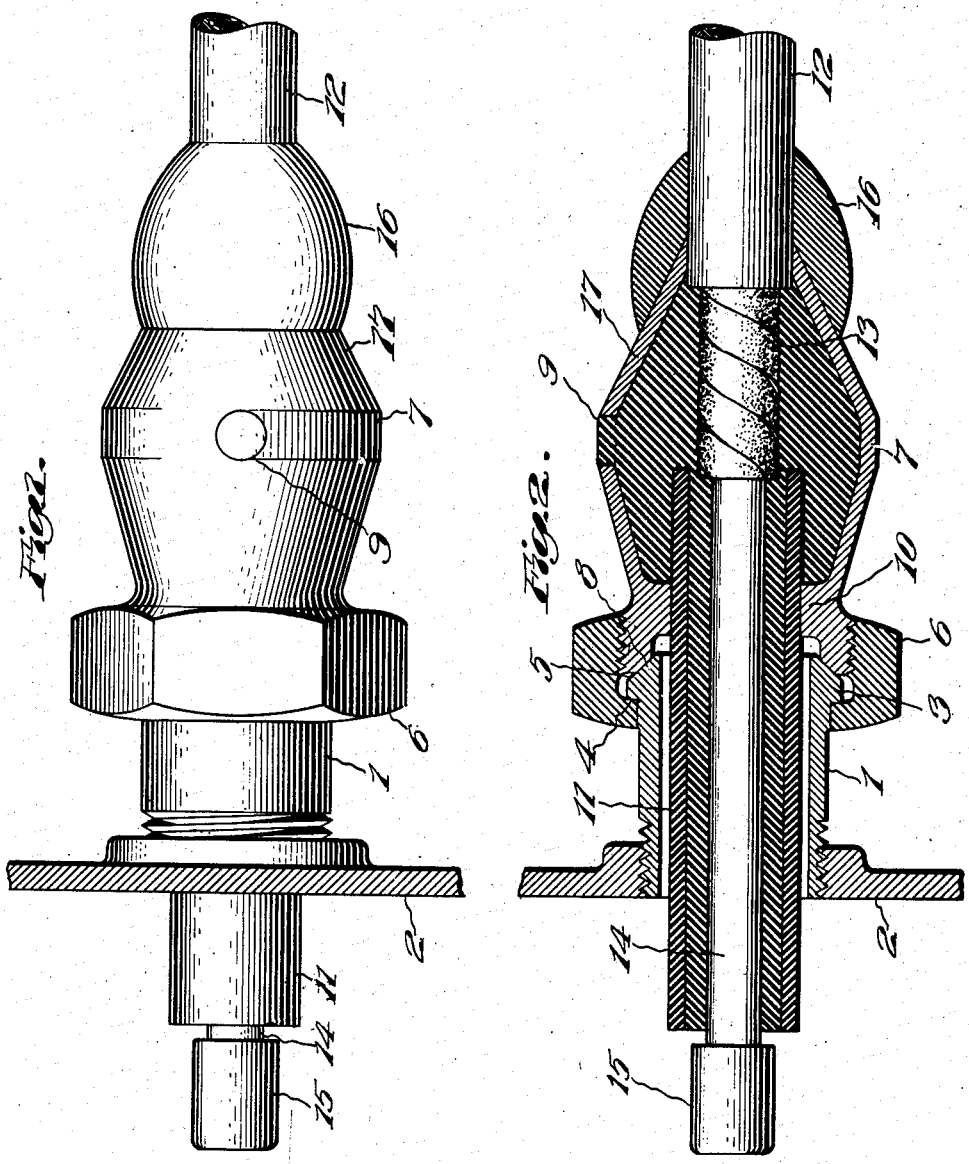

DUNCAN C. HOOKER, OF FARMINGTON, CONNECTICUT, ASSIGNOR TO THE JOHNS-PRATT COMPANY, OF HARTFORD, CONNECTICUT, A CORPORATION OF CONNECTICUT.

UNION FOR CONNECTING ELECTRIC CABLES TO SUBWAY OR JUNCTION BOXES.

1,135,376.

Specification of Letters Patent.

Patented Apr. 13, 1915.

Application filed June 20, 1914. Serial No. 846,271.

*To all whom it may concern:*

Be it known that I, DUNCAN C. HOOKER, a citizen of the United States, residing at Farmington, in the county of Hartford and State of Connecticut, have invented a new and useful Improvement in Unions for Connecting Electric Cables to Subway or Junction Boxes, of which the following is a specification.

This invention relates to a device which is designated for facilitating the connection of electric cables with junction boxes, and although it is very serviceable for connecting rubber covered cables with junction boxes, it is particularly useful for connecting underground lead covered cables with subway boxes which are placed in manholes beneath the surface of the ground. The connections between these parts must be very strong and, of course, must be watertight as well as be sufficiently insulated to prevent any leakage of current.

The object of the invention is to provide a very simple union which can be used for connecting a cable of any ordinary diameter with a junction or subway box in such manner that the connection will be strong, the joints will be watertight and all of the parts of the cable will be thoroughly and efficiently insulated.

Figure 1 of the accompanying drawings shows a plan of a union which embodies this invention. Fig. 2 shows a central longitudinal section of the same.

The union which embodies this invention has a nipple 1 with a threaded inner end that is adapted to be screwed into a threaded opening in the wall 2 of the junction or subway box. The outer end of the nipple has a head 3 that on the inside has a shoulder 4 and on the outside an annular tapering surface 5. Turning on the nipple is a flanged union nut 6. The opening through the nut at the inner side is smaller in diameter than the nipple head and the wall in the opening on the outer side of the nut is threaded. The bell 7 at the inner end has an exterior thread adapted to fit the thread in the nut and around the inside of this end of the bell is an annular inclined surface 8 that is adapted to bear against the tapering end 5 of the nipple head. The bell is shaped so that it is larger in diameter at about the middle of its length than at each end—the walls preferably tapering inward from the middle toward each end. A hole 9 is made through one side of the bell at the largest diameter. Inside of the bell near the inner end is a flange 10 and driven into this flange and held thereby is a tube 11 of insulating material.

In putting this structure to use the nipple is screwed into the opening in the wall of the box with the union nut loose on the nipple. The lead covering 12 is cut off from a section of the end of the cable and a portion of the insulating material 13 is also removed from the conductor, leaving a section 14 of the conductor bared. On the inner end of the conductor a conducting thimble 15 is fixed. The cable thus prepared is thrust into the bell with the bared portion extending through the insulating tube and the lead covered end entering the bell. The joint between the lead covered portion of the cable and the bell end is then made tight and the parts firmly joined together by applying a mass of solder 16. The bell is then joined to the nipple by drawing it up with the nut. The space about the cable in the bell and in the insulating tube, is filled with an insulating compound 17 either before or after the bell is secured to the nipple by the nut.

The parts of this structure are simple to make and easy to manipulate. The nipple can be readily screwed into the wall of any box so as to make a tight joint and the bell after it is attached to the cable end can be quickly and tightly connected with the nipple. The outer end of the bell may be made with an opening for receiving cable of the smallest diameter and if it is to be used with cable of larger size all that is necessary to do is to cut off the outer end of the bell at such a place that the opening in the end will be increased to a size that will just receive the cable. The shape of the bell is such that there is no chance for air to trap in the bell when it is being filled with insulating compound consequently it can be completely filled with insulating compound leaving no space in the interior for the entrance of, or the collection of moisture or which might decrease the dielectric strength of the sleeve when compounded. Furthermore with a bell, that is larger at the middle than at its ends, containing an insulating tube which projects some distance therein, there is a large amount of insulation between the bared section of the conductor and all metal parts. For instance it is quite a distance from the flange which holds the insulating tube around the end of the tube to the conductor, and it is a substantial distance from any portion of the inner wall of the bell to the conductor, so that should the insulating compound shrink away from the metal and leave a crack between it and the bell, there would be no chance for the leakage of current should moisture get into such a space.

The invention claimed is:

1. A cable union bell having a circular hollow shell that is conical at one end and at the other end has an exterior thread and an internal flange, said circular shell having an interior diameter that is larger at the middle than at each end and having an opening through its wall from the exterior to the interior at the largest diameter.

2. A cable union consisting of a nipple having an exterior thread at one end and a shouldered head at the other end, a flanged union nut turning on the nipple, a hollow bell, the interior diameter of which is larger at the middle than at each end and that has a filling opening at its largest diameter, fastened to the nipple by said nut, and an insulating tube carried by and projecting within the bell.

3. A cable union consisting of a nipple, a union nut turning on the nipple, a circular hollow bell that has a conical outer end which can be cut off as desired to increase the size of the opening through that end, said circular shell having an interior diameter that is larger at the middle than at each end with a filling opening through the wall at its largest diameter, said shell being detachably connected with the nipple by said nut.

4. A cable union consisting of a nipple having a thread at one end and a shouldered head at the other end, a flanged union nut turning on the nipple, a hollow bell, the interior diameter of which is larger at the middle than at each end and that has a filling opening at the largest diameter, connected with the nipple by the union nut, an insulating tube carried by and projecting within the bell, and a hardened insulating compound filling the bell about the end of said tube.

5. The combination with the wall of a junction or subway box, of a nipple screwed therein, the outer end of said nipple having an exteriorly shouldered and tapered head, a flanged union nut turning on said nipple, a hollow bell having an inwardly tapering outer end with its inner end drawn against the tapering end of the nipple by said nut, an insulating tube carried by and projecting into said bell, a cable entering said bell, means on the exterior uniting said cable and the bell, and an insulating compound filling the space between the cable and the insulating tube and bell.

DUNCAN C. HOOKER.

Witnesses:
HAZEL G. BRAINARD,
ROBERT CHAS. COLE.